US010606408B2

(12) United States Patent
Lee et al.

(10) Patent No.: US 10,606,408 B2
(45) Date of Patent: Mar. 31, 2020

(54) TOUCH-SENSING DEVICE AND TOUCH-SENSING METHOD WITH UNEXPECTED-TOUCH EXCLUSION

(71) Applicants: IMAGINATION BROADWAY LTD., New Taipei (TW); SALT INTERNATIONAL CORP., New Taipei (TW)

(72) Inventors: Shang-Li Lee, New Taipei (TW); Zong-Bin Liao, New Taipei (TW); Ko-Hao Ting, New Taipei (TW)

(73) Assignees: IMAGINATION BROADWAY LTD., New Taipei (TW); SALT INTERNATIONAL CORP., New Taipei (TW)

(*) Notice: Subject to any disclaimer, the term of this patent is extended or adjusted under 35 U.S.C. 154(b) by 0 days.

(21) Appl. No.: 15/666,848

(22) Filed: Aug. 2, 2017

(65) Prior Publication Data

US 2018/0039378 A1 Feb. 8, 2018

(30) Foreign Application Priority Data

Aug. 8, 2016 (TW) .............................. 105125215 A (51) Int. Cl.
*G06F 3/041* (2006.01)
*G06F 3/044* (2006.01)
*G06F 3/0488* (2013.01)

(52) U.S. Cl.
CPC ............ *G06F 3/0418* (2013.01); *G06F 3/044* (2013.01); *G06F 3/0416* (2013.01); *G06F 3/0488* (2013.01); *G06F 2203/04104* (2013.01)

(58) Field of Classification Search
CPC ................ G06F 3/0416; G06F 3/0488; G06F 2203/04104; G06F 3/044
See application file for complete search history.

(56) References Cited

U.S. PATENT DOCUMENTS

| 7,656,393 | B2* | 2/2010 | King | G06F 1/1643 345/173 |
| 7,877,707 | B2* | 1/2011 | Westerman | G06F 3/04883 715/863 |
| 8,963,859 | B2* | 2/2015 | Wang | G06F 3/044 178/18.01 |
| 9,041,663 | B2* | 5/2015 | Westerman | G06F 3/03547 345/173 |

(Continued)

*Primary Examiner* — Michael J Jansen, II
(74) *Attorney, Agent, or Firm* — Andrew M. Calderon; Roberts Calderon Safran & Cole P.C.

(57) ABSTRACT

A touch-sensing method with unexpected-touch exclusion includes detecting sensing area to obtain touch point; checking total number of detected points forming the touch point with first and second numbers; determining a touch of the touch point as normal touch when the total number is less than or equal to the first number; determining the touch of the touch point as invalid touch when the total number is greater than or equal to the second number; checking if the touch point belongs to an edge region or not when the total number is greater than the first number and less than the second number; determining the touch of the touch point as the invalid touch when the touch point does not belong to the edge region; and determining the touch of the touch point as an unknown touch when the touch point belongs to the edge region.

14 Claims, 5 Drawing Sheets

(56) References Cited

U.S. PATENT DOCUMENTS

| | | | | |
|---|---|---|---|---|
| 9,081,450 B1* | 7/2015 | Mohindra | | G06F 3/044 |
| 9,141,246 B2* | 9/2015 | Oshita | | G06F 3/044 |
| 9,158,454 B2* | 10/2015 | Westerman | | G06F 3/04883 |
| 9,244,545 B2* | 1/2016 | Hinckley | | G06F 3/038 |
| 9,298,310 B2* | 3/2016 | Westerman | | G06F 3/0235 |
| 9,367,186 B2* | 6/2016 | Sasselli | | G06F 3/0416 |
| 9,367,235 B2* | 6/2016 | Westerman | | G06F 3/04883 |
| 9,430,066 B2* | 8/2016 | Davidson | | G06F 3/041 |
| 9,483,146 B2* | 11/2016 | Davidson | | G06F 3/044 |
| 9,557,852 B2* | 1/2017 | Tsai | | G06F 3/0416 |
| 9,558,455 B2* | 1/2017 | Johnson | | G06N 5/027 |
| 9,632,605 B2* | 4/2017 | Davidson | | G06F 3/0416 |
| 9,760,216 B2* | 9/2017 | Boumgarten | | G06F 3/0418 |
| 9,791,976 B2* | 10/2017 | Drumm | | G06F 3/0421 |
| 9,891,732 B2* | 2/2018 | Westerman | | G06F 3/03547 |
| 9,898,122 B2* | 2/2018 | Dao | | G06F 1/1626 |
| 9,910,541 B2* | 3/2018 | Hao | | G06F 3/044 |
| 9,965,101 B2* | 5/2018 | Drumm | | G06F 3/0421 |
| 10,001,871 B2* | 6/2018 | Sharma | | G06F 3/0416 |
| 10,108,301 B2* | 10/2018 | Drumm | | G06F 3/0488 |
| 10,296,143 B2* | 5/2019 | Lee | | G06F 3/0428 |
| 10,296,146 B2* | 5/2019 | Winebrand | | G06F 3/044 |
| 10,402,005 B2* | 9/2019 | Yang | | G06F 3/0412 |
| 10,402,017 B2* | 9/2019 | Drumm | | G06F 3/0488 |
| 10,474,302 B2* | 11/2019 | Takashima | | G06F 3/0488 |
| 10,514,786 B2* | 12/2019 | Ting | | G06F 3/041 |
| 2006/0238517 A1* | 10/2006 | King | | G06F 1/1626 345/173 |
| 2008/0168403 A1* | 7/2008 | Westerman | | G06F 3/04883 715/863 |
| 2009/0095540 A1* | 4/2009 | Zachut | | G06F 3/044 178/18.03 |
| 2009/0174679 A1* | 7/2009 | Westerman | | G06F 3/03547 345/173 |
| 2010/0192109 A1* | 7/2010 | Westerman | | G06F 3/04883 715/863 |
| 2010/0211920 A1* | 8/2010 | Westerman | | G06F 3/04883 715/863 |
| 2012/0023459 A1* | 1/2012 | Westerman | | G06F 3/03547 715/863 |
| 2012/0262407 A1* | 10/2012 | Hinckley | | G06F 3/038 345/173 |
| 2012/0287076 A1* | 11/2012 | Dao | | G06F 1/1626 345/174 |
| 2013/0069886 A1* | 3/2013 | Wang | | G06F 3/0416 345/173 |
| 2013/0093692 A1* | 4/2013 | Wang | | G06F 3/0416 345/173 |
| 2013/0100043 A1* | 4/2013 | Kolbe | | G06F 3/0488 345/173 |
| 2013/0328832 A1* | 12/2013 | Boumgarten | | G06F 3/0418 345/174 |
| 2014/0104191 A1* | 4/2014 | Davidson | | G06F 3/04883 345/173 |
| 2014/0104192 A1* | 4/2014 | Davidson | | G06F 3/0416 345/173 |
| 2014/0104193 A1* | 4/2014 | Davidson | | G06F 3/041 345/173 |
| 2014/0104194 A1* | 4/2014 | Davidson | | G06F 3/0418 345/173 |
| 2014/0104225 A1* | 4/2014 | Davidson | | G06F 3/044 345/174 |
| 2014/0168142 A1* | 6/2014 | Sasselli | | G06F 3/0416 345/174 |
| 2015/0029152 A1* | 1/2015 | Westerman | | G06F 3/0235 345/174 |
| 2015/0035795 A1* | 2/2015 | Oshita | | G06F 3/044 345/174 |
| 2015/0212594 A1* | 7/2015 | Oshita | | G06F 1/169 345/158 |
| 2015/0253874 A1* | 9/2015 | Reyes | | G06F 3/038 345/157 |
| 2015/0253891 A1* | 9/2015 | Westerman | | G06F 3/03547 345/173 |
| 2016/0012348 A1* | 1/2016 | Johnson | | G06N 5/027 706/12 |
| 2016/0062549 A1* | 3/2016 | Drumm | | G06F 3/0421 345/175 |
| 2016/0062550 A1* | 3/2016 | Drumm | | G06F 3/0421 345/175 |
| 2016/0098152 A1* | 4/2016 | Drumm | | G06F 3/0421 345/175 |
| 2016/0110017 A1* | 4/2016 | Tsai | | G06F 3/0416 345/174 |
| 2016/0124571 A1* | 5/2016 | Sharma | | G06F 3/0416 345/173 |
| 2016/0154526 A1* | 6/2016 | Hao | | G06F 3/044 345/174 |
| 2017/0177110 A1* | 6/2017 | Winebrand | | G06F 3/044 |
| 2017/0255337 A1* | 9/2017 | Drumm | | G06F 3/0488 |
| 2017/0277336 A1* | 9/2017 | Yang | | G06F 3/0416 |
| 2018/0039378 A1* | 2/2018 | Lee | | G06F 3/044 |
| 2018/0067616 A1* | 3/2018 | Lee | | G06F 3/0428 |
| 2018/0074610 A1* | 3/2018 | Ting | | G06F 3/041 |
| 2018/0101263 A1* | 4/2018 | Takashima | | G06F 3/044 |
| 2018/0150152 A1* | 5/2018 | Westerman | | G06F 3/03547 |

* cited by examiner

TOUCH-SENSING DEVICE AND TOUCH-SENSING METHOD WITH UNEXPECTED-TOUCH EXCLUSION

CROSS-REFERENCE TO RELATED APPLICATION

This non-provisional application claims priority under 35 U.S.C. § 119(a) to Patent Application No. 105125215 filed in Taiwan, R.O.C. on Aug. 8, 2016, the entire contents of which are hereby incorporated by reference.

BACKGROUND

Technical Field

The instant disclosure relates to a touch-sensing technology, in particular, to a touch-sensing device and a touch-sensing method with unexpected-touch exclusion.

Related Art

More and more electronic devices adapt touch screens as their operation interfaces, so that users can operate the electronic devices by directly tapping the screen. Because the touch screen can directly provide visual feedbacks during the operation of the electronic device, the user can operate the electronic device in a convenient way. The touch screen includes a display device for providing displaying function and a touch-sensing device for providing touch-sensing function. Regarding the input operation of the touch screen, a user operates the touch screen by touching the surface of the touch screen with a stylus or the user's finger, and the electronic device recognizes the change of the coordinates of the touch points or the increase/decrease of the number of the touch points to define the gesture of the user, and the electronic device executes certain functions corresponding to the gesture according to the gesture performed by the user.

In the case that the user uses the touch screen to operate the electronic device, the palm of the user may be in contact with or come close to the touch screen when the user holds the electronic device by some ways or because of the habits of the user for writing on the touch screen. As a result, the system of the electronic device would incorrectly sense the touch of the palm as a touch of the stylus or the user's finger, so that the written information provided on the touch screen may include the touch of the palm of the user. In addition, when the user holds the periphery of the touch screen, parts of the palm of the user may be in contact with a peripheral region of the touch screen, and the rest parts of the palm of the user may in contact with a non-peripheral region of the touch region. As a result, the system of the electronic device may incorrectly recognize the touch of the palm as a touch of the finger. Hence, when the touch point caused by touch of the palm is moved from the peripheral region to the non-peripheral region or from the non-peripheral region to the peripheral region, the electronic device may perform unexpected-touch operations.

SUMMARY

In order to prevent any additional action caused by the unexpected touch of the palm, the unexpected-touch operations caused by the palm are required to be eliminated without influencing the operation of the touch screen. Hence, how to efficiently avoid the error determination or unexpected-touch operation caused by the touch of an unintended touch element (e.g., the palm of the user) is an issue.

In one embodiment, a touch-sensing method with unexpected-touch exclusion comprises detecting a sensing area to obtain a touch point; checking a total number of detected points forming the touch point with a first number and a second number; determining a touch operation of the touch point as a normal touch when the total number is less than or equal to the first number; determining the touch operation of the touch point as an invalid touch when the total number is greater than or equal to the second number; checking if the touch point belongs to an edge region or not when the total number is greater than the first number and less than the second number; determining the touch operation of the touch point as the invalid touch when the touch point does not belong to the edge region; and determining the touch operation of the touch point as an unknown touch when the touch point belongs to the edge region.

In one embodiment, a touch-sensing device comprises a plurality of first electrode lines, a plurality of second electrode lines, and a sensing controller. The first electrode lines and the second electrode lines are intersected and define a plurality of detected points configured as an array. The detected points form a sensing area. The sensing controller is electrically connected to the first electrode lines and the second electrode lines. The sensing controller executes: detecting a sensing area to obtain a touch point; checking a total number of detected points forming the touch point with a first number and a second number; determining a touch operation of the touch point as a normal touch when the total number is less than or equal to the first number; determining the touch operation of the touch point as an invalid touch when the total number is greater than or equal to the second number; checking if the touch point belongs to an edge region or not when the total number is greater than the first number and less than the second number; determining the touch operation of the touch point as the invalid touch when the touch point does not belong to the edge region; and determining the touch operation of the touch point as an unknown touch when the touch point belongs to the edge region.

Accordingly, the touch-sensing device and the touch-sensing method with unexpected-touch exclusion according to one embodiment of the instant disclosure can determine whether the touch event is caused by an unintended touch element (e.g., the palm or a portion of the palm of the user), so that the unexpected-touch operations caused by the unintended touch element can be eliminated.

BRIEF DESCRIPTION OF THE DRAWINGS

The disclosure will become more fully understood from the detailed description given herein below for illustration only, and thus not limitative of the disclosure, wherein:

FIG. 2 illustrates a schematic view of one embodiment of the signal sensor shown in

FIG. 1;

DETAILED DESCRIPTION

A touch-sensing device and a touch-sensing method with unexpected-touch exclusion according to the embodiment of the instant disclosure may be adapted to a touch control apparatus. The touch control apparatus may be, but not limited to, a touch screen, an electronic graphics tablet, a handwriting board, a smart phone, a portable navigation device (PND), a portable digital frame (PDF), an e-book, a notebook, a tablet or pad, or other electronic devices with touch control function. For example, the term "touch event" described in the following paragraphs may be triggered by different elements; in the case of the touch screen, the touch event may be triggered by a finger or a stylus; in the case of the electronic graphics tablet, the touch event may be triggered by an element corresponding to the electronic graphic table (e.g., a stylus painting brush); and in the case of the handwriting board, the touch event may be triggered by an element corresponding to the handwriting board (e.g., a stylus or a finger).

Figure 1:
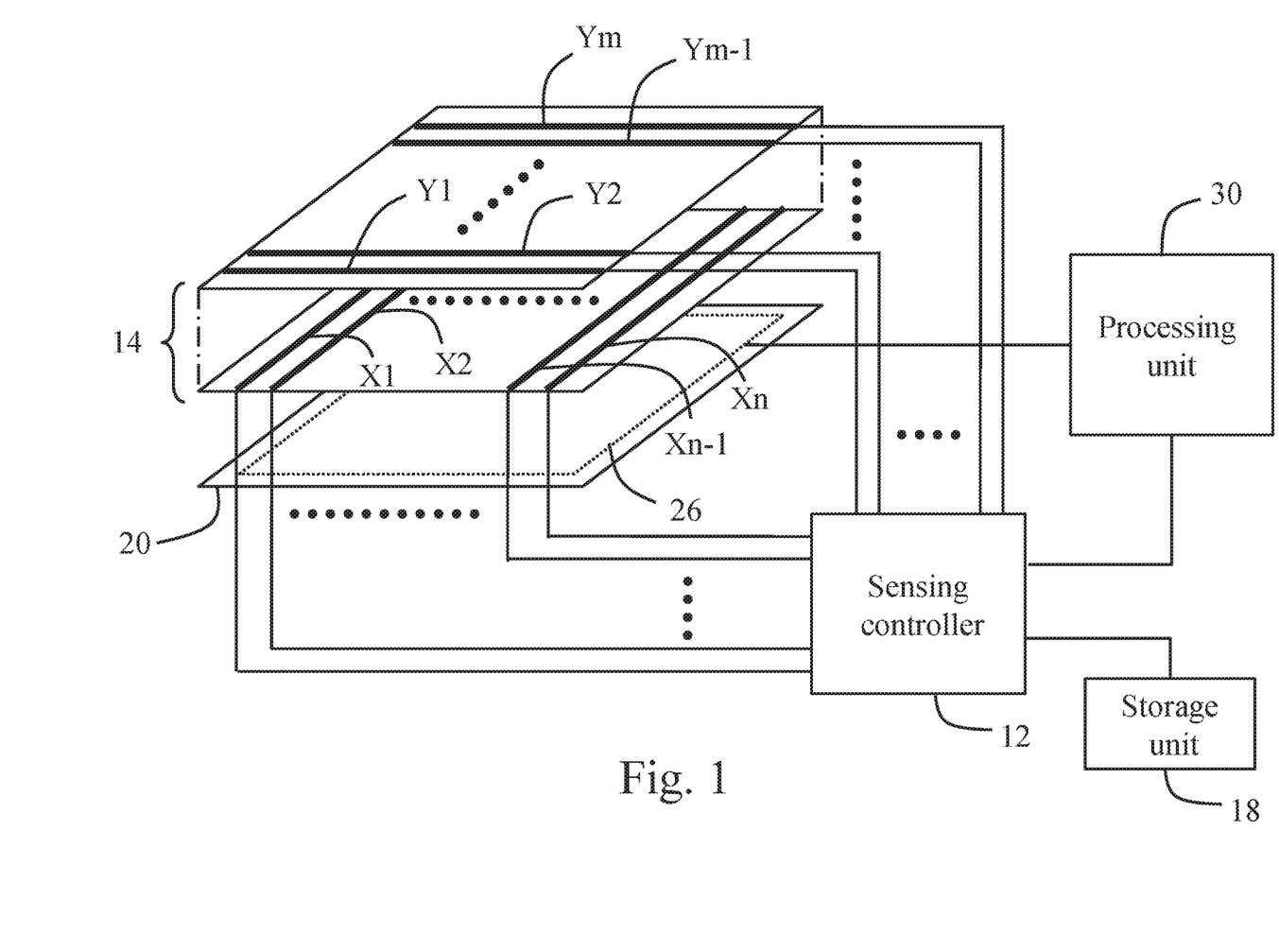
FIG. 1 illustrates a schematic view of a touch control apparatus applying one embodiment of the touch-sensing devices.
Figure 2:
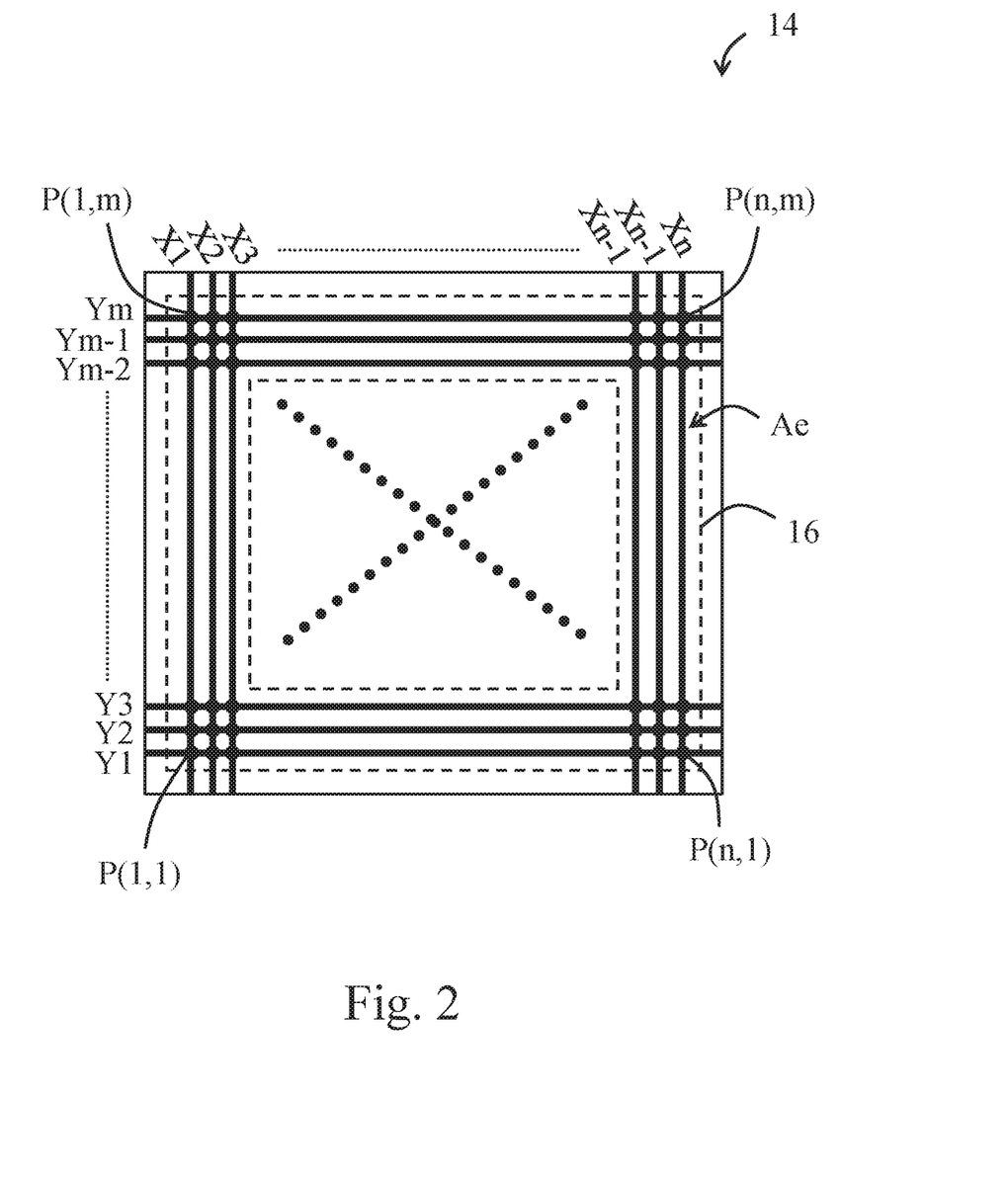

FIG. 1 illustrates a schematic view of a touch control apparatus applying one embodiment of the touch-sensing devices. FIG. 2 illustrates a schematic view of one embodiment of the signal sensor shown in FIG. 1. In the following paragraphs, the touch control apparatus is an electronic apparatus, but embodiments are not limited thereto.

Please refer to FIG. 1. The touch control apparatus comprises a touch-sensing device, a display device 20, and a processing unit 30. The touch-sensing device comprises a sensing controller 12 and a signal sensor 14. The sensing controller 12 is connected to the signal sensor 14, and the signal sensor 14 is located on a display surface of the display device 20. The processing unit 30 is electrically connected to the sensing controller 12 and the display device 20. The signal sensor 14 comprises a plurality of electrode lines intersected with each other (e.g., first electrode lines $X1$-$Xn$ and second electrode lines $Y1$-$Ym$). Wherein, n and m are positive integers, and n may be equal to or not equal to m. The first electrode lines $X1$-$Xn$ and the second electrode lines $Y1$-$Ym$ are electrically connected to the sensing controller 12.

From a top view of the electrode lines, the first electrode lines $X1$-$Xn$ are intersected with the respective second electrode lines $Y1$-$Ym$ to define a plurality of detected points $P(1,1)$-$P(n,m)$ configured as an array, as shown in FIG. 2. The detected points $P(1,1)$-$P(n,m)$ form a sensing area 16.

In some embodiments, the top view of the intersected first electrode lines $X1$-$Xn$ and second electrode lines $Y1$-$Ym$ are formed as a repeated rhombus pattern, a grid pattern, or a railing pattern. In some embodiments, the first electrode lines $X1$-$Xn$ and the second electrode lines $Y1$-$Ym$ may be respectively disposed on different planes (as shown in FIG. 1); in other words, the electrode lines are respectively disposed on different sensing layers. Wherein, an insulation layer may be, but not limited to, disposed between the sensing layers. In some other embodiments, the first electrode lines $X1$-$Xn$ and the second electrode lines $Y1$-$Ym$ may be respectively disposed on a same plane; in other words, the electrode lines are on a single sensing layer. In some embodiments, the first electrode lines $X1$-$Xn$ are emission electrode lines, and the second electrode lines $Y1$-$Ym$ are reception electrode lines. In some other embodiments, the first electrode lines $X1$-$Xn$ are reception electrode lines, and the second electrode lines $Y1$-$Ym$ are emission electrode lines. In some embodiments, the sensing layers may be patterned electric conductive thin films, such as but not limited to, indium tin oxide (ITO) films.

Wherein a predetermined peripheral range of the sensing area 16 is defined as an edge region Ae (i.e., the region between the two dash-line frames shown in FIG. 2). For example, a storage unit 18 of the touch-sensing device may store a setting describing a predetermined peripheral range of the sensing area 16 as an edge region Ae. In some embodiments, the storage unit 18 may be externally assembled with the sensing controller 12 and electrically connected to the sensing controller 12, as shown in FIG. 1. In some other embodiments, the storage unit 18 may be internally assembled with the sensing controller 12 (i.e., built in the sensing controller 12).

In some embodiments, the edge region Ae is a partial sensing area defined by several of the first electrode lines $X1$-$Xn$ near a first side of the touch-sensing device (the sensing area 16), and several of the first electrode lines near a second side of the touch-sensing device (the sensing area 16), as well as several of the second electrode lines $Y1$-$Ym$ near a third side of the touch-sensing device (the sensing area 16), and several of the second electrode lines near a fourth side of the touch-sensing device (the sensing area 16). When the predetermined peripheral range includes three electrode lines near the sensing area 16, the edge region Ae is the partial sensing area defined by the first electrode lines $X1$, $X2$, $X3$, $Xn-2$, $Xn-1$, and $Xn$ and the second electrode lines $Y1$, $Y2$, $Y3$, $Ym-2$, $Ym-1$, and $Ym$.

In some embodiments, the signal sensor 14 may be transparent or translucent. Therefore, by seeing through the signal sensor 14, contents displayed on the display device 20 are visible to a user. In other words, light rays emitted from the display device 20 can penetrate and pass through the signal sensor 14 to reach the eyes of the user. In some other embodiments, the signal sensor 14 may be neither transparent nor translucent. For example, the non-transparent signal sensor 14 may be utilized in those touch control device not having the display device 20 like an electronic graphics tablet or a handwriting boards.

When the user touches the touch control apparatus, the touch-sensing device detects touch events (touch operations) via the sensing area 16, and the processing unit 30 performs a further process based on position information corresponding to the touch events. The contents of the further process are based on an application program of the touch control apparatus corresponding to the position of the display device 20 where the touch events occur. For example, but not limited to, in the further process, the processing unit 30 starts a certain application in responsive to the touch events or the display device 20 displays tracks of a stylus or a finger on the position where the touch event occur. In some embodiments, the processing unit 30 may be a processor in the touch-sensing device, or may be a processor outside the touch-sensing device.

In this embodiment, the sensing controller 12 may utilize capacitive sensing technologies like self-capacitance detection or mutual capacitance detection to detect a touch operation of a user by the signal sensor 14. The sensing controller 12 detects normal touch operations; besides, the sensing controller 12 can determine if a touch operation is caused by an unintended touch element (e.g., the palm or a portion of the palm of a user) to exclude the unexpected-touch operation caused by the unintended touch element.

Figure 3:
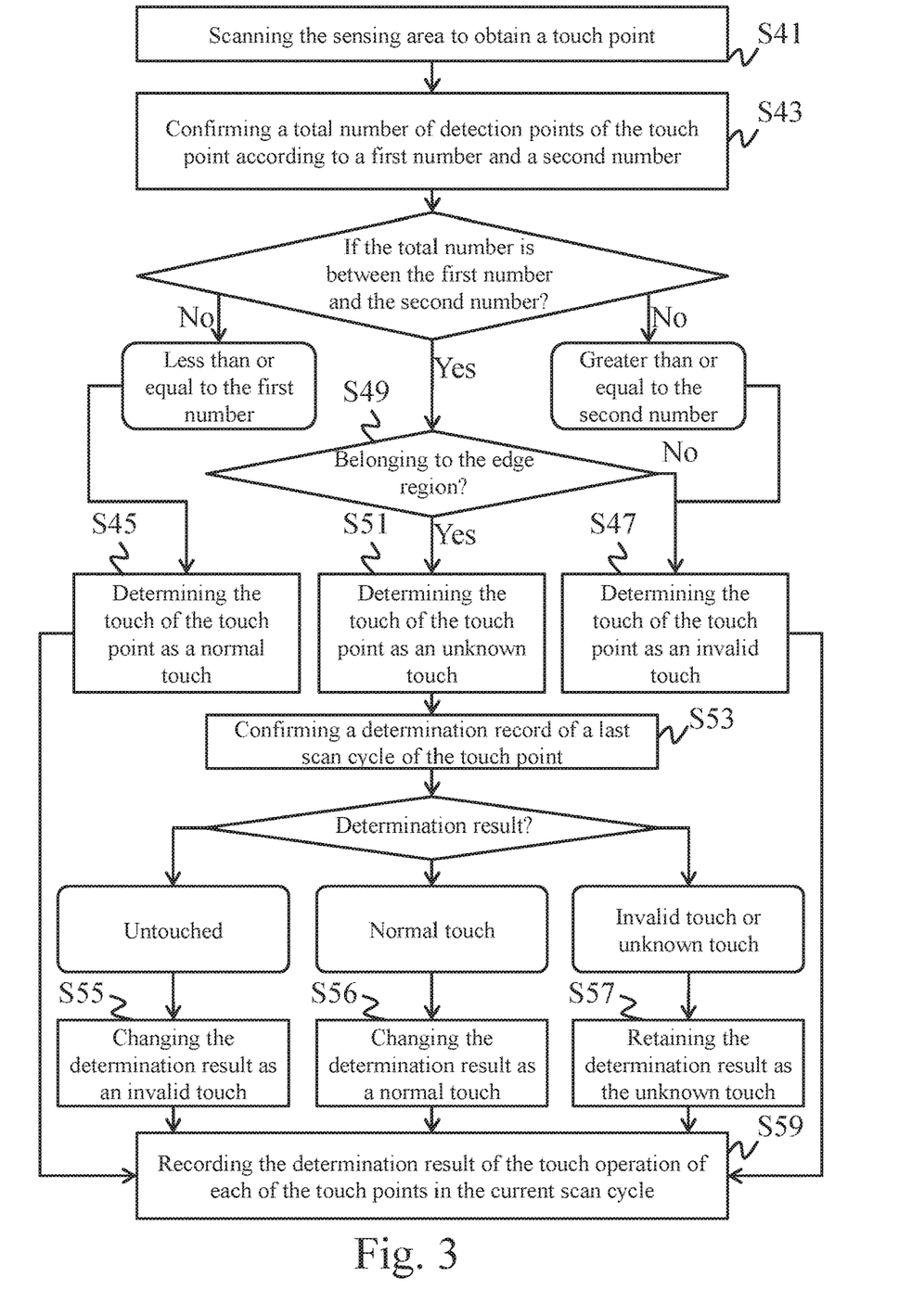
FIG. 3 illustrates a flowchart of one embodiment of a touch-sensing method with unexpected-touch exclusion.

FIG. 3 illustrates a flowchart of one embodiment of a touch-sensing method with unexpected-touch exclusion.

Figure 4:
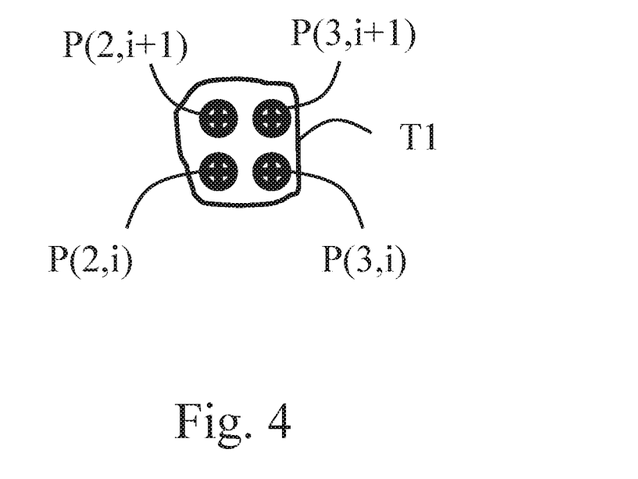
FIG. 4 illustrates a schematic view of one embodiment of the touch point.
Figure 5:
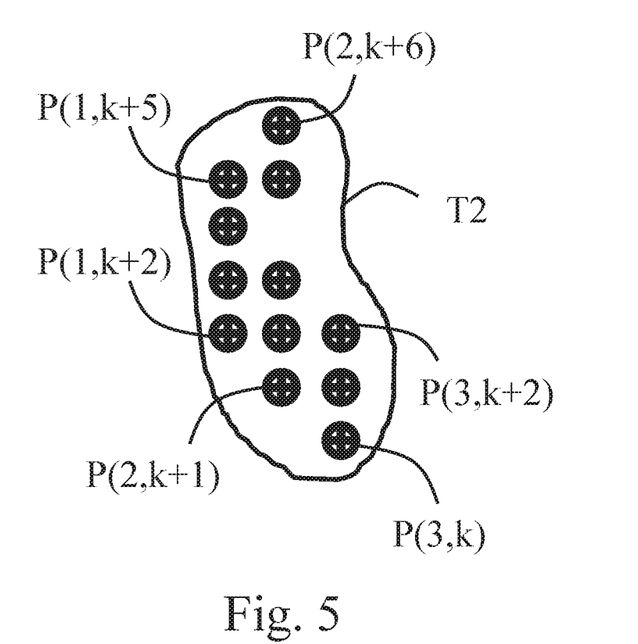
FIG. 5 illustrates a schematic view of another embodiment of the touch point.

Please refer to FIG. 3. In the touch-sensing method, the sensing controller 12 may repeatedly execute several scan cycles. In each of the scan cycles, the sensing controller 12 scans the electrode lines (i.e., detects the sensing area 16) to obtain at least one touch point T1, T2 (as shown in FIGS. 4 and 5) occurring on the sensing area 16 (Step S41). Please refer to FIGS. 4 and 5. Each of the touch points T1 (or T2) is formed by several detected points P(2,i), P(2,i+1), P(3,i), and P(3,i+1) (or P(1,k+2)–P(1,k+5), P(2,k+1)–P(2,k+6), and P(3,k)–P(3,k+2)). Wherein, i is a positive integer between 1 and m−1, and k is a positive integer between 1 and m−6.

Next, the sensing controller 12 determines the attribute of the touch operation of each of the detected touch points T1 (or T2); that is, the sensing controller 12 determines the touch operation of the touch points T1 (or T2) is a normal touch, an invalid touch, or an unknown touch. Wherein, the touch operation of the touch point T1 (or T2) means the touch operation causing the signal sensor 14 to generate the touch point. The normal touch is a touch operation caused by a proper touch element (for example, a finger, a stylus painting brush, a stylus, etc.). The invalid touch is a touch operation caused by an unintended touch element (e.g., a palm or a portion of the palm). The unknown touch is a touch operation caused by an unknown touch element.

For the sake of clarity, in the following paragraphs, one touch point T1 (or T2) is provided to describe the way for determining the attribute of the touch operation. In determining the attribute of the touch operation of the touch point T1 (or T2), the sensing controller 12 checks a total number of the detected points of the touch point T1 (or T2) with a first number and a second number (step S43). Wherein, the second number is greater than the first number.

When the sensing controller 12 checks that the total number of the detected points of the touch point T1 (or T2) is less than or equal to the first number, the sensing controller 12 determines the touch operation of the touch point T1 (or T2) as a normal touch (step S45).

When the sensing controller 12 checks that the total number of the detection points of the touch point T1 (or T2) is greater than or equal to the second number, the sensing controller 12 determines the touch operation of the touch point T1 (or T2) as the invalid touch (step S47).

When the sensing controller 12 checks the total number of the detected points of the touch point T1 (or T2) is greater than the first number and less than the second number (i.e., in a range between the first number and the second number), the sensing controller 12 further checks if the touch point T1 (or T2) belongs to the edge region Ae or not (step S49).

In some embodiments, the storage unit 18 may store a number criterion in advance, and the sensing controller 12 can check the number of the detected points of the touch point T1 (or T2) in the edge region Ae with the number criterion so as to determine whether the touch point T1 (or T2) belongs the edge region Ae.

In some embodiments, the number criterion may be greater than or equal to a number threshold value (e.g., 1, 2, or more). In other words, the sensing controller 12 checks if the number of the detected points of the touch point T1 (or T2) in the edge region Ae is greater than or equal to the number threshold value or not. When the sensing controller 12 checks that the number of the detected points of the touch point T1 (or T2) in the edge region Ae is greater than or equal to the number threshold value, the sensing controller 12 determines that the touch point T1 (or T2) belongs to the edge region Ae. When the sensing controller 12 checks that the number of the detected points of the touch point T1 (or T2) in the edge region Ae is less than the number threshold value, the sensing controller 12 determines that the touch point T1 (or T2) does not belong to the edge region Ae. For example, in the case that the number criterion is greater than or equal 1, when the sensing controller 12 checks any of the detected points of the touch point T1 (or T2) is in the edge region Ae, the sensing controller 12 determines that the touch point T1 (or T2) belongs to the edge region Ae; otherwise, the sensing controller 12 determines that the touch point T1 (or T2) does not belong to the edge region Ae.

In some other embodiments, the number criterion may be greater than or equal to a predetermined ratio. In other words, the sensing controller 12 checks if the number of the detected points of the touch point T1 (or T2) in the edge region Ae is greater than or equal to a predetermined ratio of the total number of the detected points of the touch point T1 (or T2) or not. For example, supposed that the total number of the detection points of the touch point T1 (or T2) is 3 and the predetermined ratio of the total number of the detection points of the touch point is 30%, the sensing controller 12 would check if the number of the detection points of the touch point T1 (or T2) in the edge region is greater than or equal to 0.9 or not, and the sensing controller 12 determines that the touch point T1 (or T2) belongs to the edge region Ae when the number of the detection points of the touch point (or T2) in the edge region Ae is greater than or equal to 0.9.

When the sensing controller 12 checks that the touch point T1 (or T2) does not belong to the edge region Ae, the sensing controller 12 determines that the touch operation of the touch point T1 (or T2) as an invalid touch (step S47).

When the sensing controller 12 checks that the touch point T1 (or T2) belongs to the edge region Ae, the sensing controller 12 determines that the touch operation of the touch point T1 (or T2) as an unknown touch (step S51).

In some embodiments, when the touch operation of the touch point T1 (or T2) is determined as the unknown touch, the sensing controller 12 would check a determination record of a previous scan cycle of the touch point T1 (or T2) (step S53).

When the sensing controller 12 checks that the determination record of the previous scan cycle of the touch point T1 (or T2) is untouched (i.e., when the touch point T1 (or T2) at the same position is not detected in the previous scan cycle or when the current scan cycle is the first one of the scan cycles), the sensing controller 12 changes the touch operation of the touch point T1 (or T2) from the unknown touch to the invalid touch (step S55). That is, the determination result of the touch operation of the touch point T1 (or T2) in the current scan cycle is forced to be an invalid touch.

When the sensing controller 12 checks that the determination record of the previous scan cycle of the touch point T1 (or T2) is a normal touch, the sensing controller 12 changes the touch operation of the touch point T1 (or T2) from the unknown touch to the normal touch (step S56). That is, the determination result of the touch operation of the touch point T1 (or T2) in the current scan cycle is forced to be a normal touch.

When the sensing controller 12 checks that the determination record of the previous scan cycle of the touch point T1 (or T2) is an invalid touch or an unknown touch, the sensing controller 12 retains the determined result. That is, the sensing controller 12 determines the touch operation of the touch T1 (or T2) in the current scan cycle as an unknown touch (step S57).

In some embodiments, after the attributes of the touch operations are determined, the sensing controller 12 may record the determined result of the touch operation of each of the touch points in the current scan cycle in the storage unit 18 (step S59).

In some embodiments, the sensing controller 12 may record the determined result of the touch operation of each of the touch points by different tags. For example, a first tag may represent a normal touch, a second tag may represent an invalid touch, and a third tag may represent an unknown touch. When the sensing controller 12 determines that the touch operation of a first touch point as a normal touch, the sensing controller 12 tags a first tag in the determination record of the current scan cycle in which the determination record corresponds to a code or position information of the first touch point. When the sensing controller 12 determines that the touch operation of a second touch point as an invalid touch, the sensing controller 12 tags a second tag in the determination record of the current scan cycle in which the determination record corresponds to a code or position information of the second touch point. When the sensing controller 12 determines that the touch operation of a third touch point as an unknown touch, the sensing controller 12 tags a third tag in the determination record of the current scan cycle in which the determination record corresponds to a code or position information of the third touch point.

Figure 6:
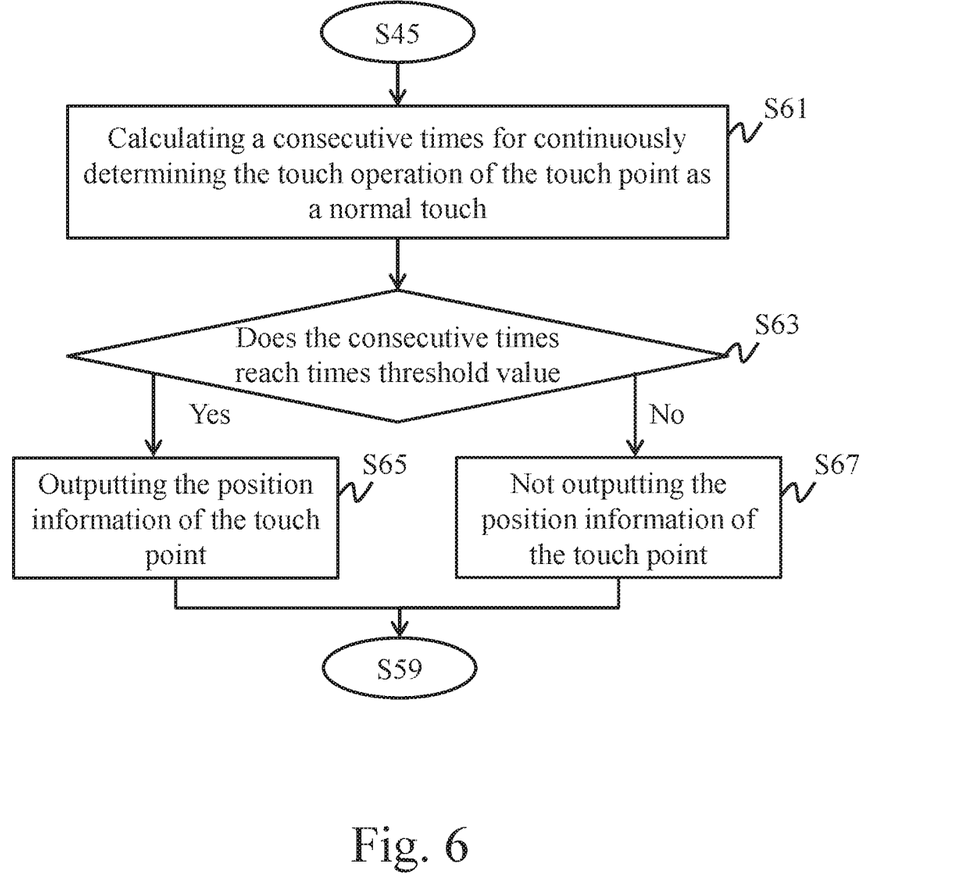
FIG. 6 illustrates a partial flowchart of another embodiment of the touch-sensing method with unexpected-touch exclusion.

In some embodiments, as shown in FIG. 6, when the touch operation of the touch point T1 (or T2) is determined as a finger touch operation, the sensing controller 12 calculates a consecutive times for continuously determining the touch operation of the touch point T1 (or T2) as a normal touch (step S61), and the sensing controller 12 checks if the consecutive times reaches a times threshold value (in the following paragraphs, called first threshold value) or not (step S63).

When the consecutive times reaches the first threshold value, the sensing controller 12 performs a point report for the touch point T1 (or T2); namely, the sensing controller 12 outputs the position information of the touch point T1 (or T2) (step S65). When the consecutive times does not reaches the first threshold value, the sensing controller 12 does not perform the point report for the touch point T1 (or T2); namely, the sensing controller 12 does not output the position information of the touch point T1 (or T2).

In other words, when the same touch point T1 (or T2) is detected in a number of consecutive scan cycles in which the number is the first threshold value and when the touch operations of the touch point (or T2) in the number of the consecutive scan cycles are all determined as a normal touch, the sensing controller 12 reports the position information of the touch point (or T2).

In some embodiments, the sensing controller 12 may calculate the consecutive times by accumulating the times of the touch operations of the touch point being determined as a normal touch, and the sensing controller 12 may reset the consecutive times when the same touch point T1 (or T2) is not detected in the next scan cycle or when the touch operation of the same touch point T1 (or T2) is not determined as a normal touch.

In some other embodiments, the sensing controller 12 may calculate a consecutive times of the touch operation of the same touch point T1 (or T2) being determined as a normal touch by the inquiry of the determination record of the touch operation of the touch point T1 (or T2) in previous scan cycles in the case that the touch operation of the touch point T1 (or T2) is determined as a normal touch.

In some embodiments, when the sensing controller 12 detects the touch point T1 (or T2) but the determined result of the touch operation of the touch point T1 (or T2) is an invalid touch or an unknown touch, the sensing controller 12 does not output the position information of the touch point T1 (or T2).

In some embodiments, after the touch point T1 (or T2) is set as a reporting state (i.e., the sensing controller 12 outputs the position information of the touch point T1 (or T2) once the touch point T1 (or T2) is set as reporting state.), the sensing controller 12 will check the determination record of the previous scan cycles when the sensing controller 12 determines the touch operation of the same touch point T1 (or T2) in the subsequent scan cycles as an invalid touch or an unknown touch or when the sensing controller 12 does not detect the touch point T1 (or T2) in the subsequent scan cycles (i.e., when the touch operation is not determined as a normal touch in the subsequent scan cycles). Specifically, by checking the determination record of the previous scan cycles, the sensing controller 12 can check the consecutive times of the touch point T1 (or T2) not being determined as a normal touch after the touch point T1 (or T2) is in the reporting state. Next, when the consecutive times of the touch point T1 (or T2) not being determined as a normal touch reaches to another times threshold value (in the following paragraphs called second threshold value), the sensing controller 12 stops outputting the position information of the touch point T1 (or T2). In other words, after the sensing controller 12 starts outputting the position information of the touch point T1 (or T2), the sensing controller 12 will stop outputting the position information of the touch point T1 (or T2) when the sensing controller 12 does not determine the touch operation of the touch point T1 (or T2) as a normal touch in consecutive several scan cycles (e.g., when the sensing controller 12 does not detect the touch point T1 (or T2) in the consecutive scan cycles or when the sensing controller 12 determines the touch operation of the touch point T1 (or T2) as an invalid touch or an unknown touch in the consecutive scan cycles).

In some embodiments, the second threshold value may be 2. In other words, after the sensing controller starts outputting the position information of the touch point T1 (or T2), the sensing controller stops outputting the position information of the touch point T1 (or T2) when the sensing controller does not determine the touch operation of the touch point as a normal touch in two consecutive scan cycles.

For example, the determination record of the touch points T1-T3 is supposed as Table 1 provided below. Wherein, F is the first tag representing a normal touch, P is the second tag representing an invalid touch, and U is the third tag representing an unknown touch.

TABLE 1

| | | Scan circle | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Touch points | T1 | — | — | — | — | P | U | U | U | U | U | U | U |
| | T2 | P | F | F | P | U | U | U | U | U | U | U | U |
| | T3 | P | F | F | F | F | F | F | F | F | P | P | P |

The sensing controller 12 does not detect the touch point T1 during the first to fourth scan cycles (i.e., during first to fourth scan cycles, the touch point T1 is untouched). During the fifth to twelfth scan cycles, the sensing controller 12 detects the touch point T1. During the sixth to twelfth scan cycles, the sensing controller 12 determines the touch operation of the touch point T1 as an unknown touch and does not output the position information of the touch point. In the fifth scan cycle, the sensing controller 12 originally determines the touch operation of the touch point T1 as an unknown touch operation. However, the sensing controller 12 does not detect the touch point T1 in the fourth scan cycle; therefore, the determined result of the fifth scan cycle is forced to be an invalid touch, and the sensing controller 12 does not output the position information of the touch point T1.

During the first to twelfth scan cycles, the sensing controller 12 detects the touch point T2. In the second scan cycle and the third scan cycle, the sensing controller 12 determines the touch operation of the touch point T2 as a normal touch. In the first scan cycle and the fourth scan cycle, the sensing controller 12 determines the touch operation of the touch point T2 as an invalid touch. During the fifth to twelfth scan cycles, the sensing controller 12 determines the touch operation of the touch point T2 as an unknown touch. Supposed that the first threshold value is 3, the sensing controller 12 does not output the position information of the touch point T2 during first to twelfth scan cycles since the touch operation of the touch point T2 has been consecutively determined as a normal touch for twice times (i.e., the consecutive times does not reach the first threshold value).

During the first to twelfth scan cycles, the sensing controller 12 detects the touch point T3. In the second to ninth scan cycles, the sensing controller 12 determines the touch operation of the touch point T3 as a normal touch. In the fifth scan cycle, the sensing controller 12 originally determines the touch operation of the touch point T3 as an unknown touch. However, the determination record of the touch operation of the touch point T3 in the fourth scan cycle is a normal touch; therefore, the determined result of the touch operation of the touch point T3 in the fifth scan cycle is forced to be an invalid touch. Likewise, in each of the sixth to ninth scan cycles, the sensing controller 12 originally determines the touch operation of the touch point T3 as an unknown touch. However, the determination record of the touch operation of the touch point T3 in each of the scan cycles just before the corresponding current scan cycle is a normal touch; therefore, the touch operation of the touch point T3 in each of the sixth to ninth scan cycles is forced to be a normal touch. In the first scan cycle and during the tenth to twelfth scan cycle, the sensing controller 12 determines the touch operation of the touch point T3 as an invalid touch. Supposed that the first threshold value is 3 and the second threshold value is 2, the sensing controller 12 starts outputting the position information of the touch point T3 in the fourth scan cycle since the touch operation of the touch point T3 has been consecutively determined as a normal touch for three times (i.e., the consecutive times reaches the first threshold value). Although the sensing controller 12 has determined the touch operation of the touch point T3 as an invalid touch in the tenth scan cycle, the sensing controller 12 remains outputting the position information of the touch point T3 since the consecutive times does not reach the second threshold value. In the eleventh scan cycle, the sensing controller 12 determines the touch operation of the touch point T3 as an invalid touch again. In other words, the touch operation of the touch point T3 has not been consecutively determined as a normal touch for two times (i.e., the consecutive times reaches the second threshold value). Therefore, the sensing controller 12 stops outputting the position information of the touch point T3. That is, during the first to third scan cycles and during the eleventh to twelfth scan cycles, the sensing controller 12 does not output the position information of the touch point T3; while the sensing controller 12 outputs the position information of the touch point T3 during the fourth to tenth scan cycles.

It is understood that, the execution order for each of the steps is not limited by the order presented in the foregoing paragraphs, and the execution order for the steps can be properly adjusted according to the contents of the steps. For example, although the last step illustrated in the figures is the step S59, but embodiments are not limited thereto. the step S59 may be executes in any moment after determination of the touch operation of the touch point is checked (i.e., steps S45, S47, S55, and S57); for example, the step S59 may be executed before the step S61.

In some embodiments, the storage unit 18 may be applied to store programs, parameters, and data for running the touch-sensing method with unexpected-touch exclusion (e.g., the storage unit may store the program for running the touch-sensing method with unexpected-touch exclusion according to one embodiment of the instant disclosure, the first number, the second number, the threshold values, etc.). The storage unit may be implemented by one or more memory elements. The memory elements may be a read-only memory (ROM), a random access memory (RAM), a nonvolatile memory, a volatile memory, a static memory, a dynamic memory, a flash memory, and/or any apparatus for storing digital information.

In some embodiments, the touch-sensing method with unexpected-touch exclusion according to the embodiments of the instant disclosure may be implemented by a computer program product. Hence, when any touch-sensing apparatus loads and executes the program, the touch-sensing method with unexpected-touch exclusion according to one embodiment of the instant disclosure can be achieved. In some embodiments, the computer program product may be a readable record medium, and the program stored in the readable record medium for being loaded by a computer. In some embodiments, the program itself may be the computer program product and transmitted to a touch control apparatus wiredly or wirelessly.

Accordingly, the touch-sensing device and the touch-sensing method with unexpected-touch exclusion according to one embodiment of the instant disclosure can determine whether the touch event is caused by an unintended touch element (e.g., the palm or a portion of the palm of the user), so that the unexpected-touch operations caused by the unintended touch element can be eliminated.

What is claimed is:

1. A touch-sensing method with unexpected-touch exclusion, comprising:
   detecting a touch point within a sensing area, wherein the sensing area is formed by a plurality of detection points, the touch point is formed by a touched number of the detection points, and a predetermined peripheral range of the sensing area is defined as an edge region;
   checking the touched number of the detection points of the touch point with a first number and a second number, wherein the second number is greater than the first number;
   determining a touch operation of the touch point as a normal touch when the touched number is less than or equal to the first number;
   determining the touch operation of the touch point as an invalid touch when the touched number is greater than or equal to the second number;
   checking if the touch point belongs to the edge region or not when the touched number is greater than the first number and less than the second number;

determining the touch operation of the touch point as the invalid touch when the touch point does not belong to the edge region;

determining the touch operation of the touch point as an unknown touch when the touch point belongs to the edge region;

checking a determination record of a previous scan cycle of the touch point when the touch operation of the touch point is determined as the unknown touch; and changing the touch operation of the touch point from the unknown touch to the normal touch when the determination record of the previous scan cycle of the touch point was the normal touch.

2. The touch-sensing method according to claim 1, wherein when the determination record of the previous scan cycle of the touch point is untouched, changing the touch operation of the touch point from the unknown touch to the invalid touch.

3. The touch-sensing method according to claim 1, further comprising calculating a consecutive times for continuously determining the touch operation of the touch point as the normal touch when the touch operation of the touch point is determined as the normal touch; and outputting position information of the touch point according to a times threshold value and the consecutive times.

4. The touch-sensing method according to claim 3, wherein when the touch point is in a reporting state and when the touch operation of the touch point in a plurality of continuous scan cycles is determined as the invalid touch, the unknown touch, or undetected, stopping outputting the position information of the touch point.

5. The touch-sensing method according to claim 1, further comprising:

recording a determined result of the touch operation of the touch point of a current scan cycle;

checking the determined result of the touch operation of the touch point of a previous scan cycle; and performing a point report for the touch point determined as the normal touch according to the determined result of the current scan cycle and the determined result of the previous scan cycle.

6. The touch-sensing method according to claim 1, wherein the sensing area is defined by a plurality of first electrode lines and a plurality of second electrode lines, the edge region is defined by several of the first electrode lines near a first side of the sensing area, and several of the first electrode lines near a second side of the sensing area, as well as several of the second electrode lines near a third side of the sensing area, and several of the second electrode lines near a fourth side of the sensing area.

7. The touch-sensing method according to claim 1, wherein a plurality of first electrode lines and a plurality of second electrode lines define the plurality of detection points as an array, and the edge region comprises a predetermined number of the first electrode lines and the second electrode lines at outer edges of the array.

8. A touch-sensing device, comprising:

a plurality of first electrode lines;

a plurality of second electrode lines intersected with the first electrode lines, wherein the first electrode lines and the second electrode lines define a plurality of detection points configured as an array, and the detection points form a sensing area, a predetermined peripheral range of the sensing area is defined as an edge region; and a sensing controller electrically connected to the first electrode lines and the second electrode lines, wherein the sensing controller executes:

detecting a touch point within the sensing area, wherein the touch point is formed by a touched number of the detection points;

checking the touched number of the detection points of the touch point with a first number and a second number, wherein the second number is greater than the second number;

determining a touch operation of the touch point as a normal touch when the touched number is less than or equal to the first number;

determining the touch operation of the touch point as an invalid touch when the touched number is greater than or equal to the second number;

checking if the touch point belongs to the edge region or not when the touched number is greater than the first number and less than the second number;

determining the touch operation of the touch point as an invalid touch when the touch point does not belong to the edge region;

determining the touch operation of the touch point as an unknown touch when the touch point belongs to the edge portion;

checking a determination record of a previous scan cycle of the touch point when the touch operation of the touch point is determined as the unknown touch; and changing the touch operation of the touch point from the unknown touch to the normal touch when the determination record of the previous scan cycle of the touch point was the normal touch.

9. The touch-sensing device according to claim 8, wherein when the touch operation of the touch point is determined as the unknown touch and when a determination record of a previous scan cycle of the touch point is untouched, the sensing controller changes the touch operation of the touch point from the unknown touch to the invalid touch.

10. The touch-sensing device according to claim 8, wherein when the touch operation of the touch point is determined as the normal touch, the sensing controller calculates a consecutive times for continuously determining the touch operation of the touch point as the normal touch when the touch operation of the touch point is determined as the normal touch, and the sensing controller outputs position information of the touch point when the consecutive times achieves a times threshold value.

11. The touch-sensing device according to claim 10, wherein when the touch point is in a reporting state and the touch operation of the touch point in a plurality of continuous scan cycles is determined as the invalid touch, the unknown touch, or undetected, the sensing controller stops outputting the position information of the touch point.

12. The touch-sensing device according to claim 8, wherein when both determined results of the touch operation of the touch point of a current scan cycle and of a previous scan cycle are not the normal touch, the sensing controller does not output position information of the touch point.

13. The touch-sensing device according to claim 8, wherein the edge region is a partial sensing area comprising several of the first electrode lines near a first side of the sensing area, and several of the first electrode lines near a second side of the sensing area, as well as several of the second electrode lines near a third side of the sensing area, and several of the second electrode lines near a fourth side of the sensing area.

14. The touch-sensing device according to claim 8, wherein the edge region comprises a predetermined number of the first electrode lines and the second electrode lines near sides of the touch-sensing device.

* * * * *